United States Patent [19]

Lindenthal

[11] Patent Number: 4,543,011

[45] Date of Patent: Sep. 24, 1985

[54] CLUTCH FOR RIGIDLY CONNECTING COAXIAL PARTS OF CONSTRUCTION, ESPECIALLY FOR CARDAN SHAFTS

[75] Inventor: Hans Lindenthal, Heidenheim, Fed. Rep. of Germany

[73] Assignee: J. M. Voith GmbH, Heidenheim, Fed. Rep. of Germany

[21] Appl. No.: 448,310

[22] Filed: Dec. 9, 1982

[30] Foreign Application Priority Data

Dec. 11, 1981 [DE] Fed. Rep. of Germany ....... 3149156

[51] Int. Cl.[4] .............................................. F16D 1/00
[52] U.S. Cl. ..................................... 403/338; 403/97; 403/273; 403/341; 403/364; 403/373; 403/286; 285/408; 285/381
[58] Field of Search ............... 403/338, 341, 286, 364, 403/373, 97, 376, 273; 285/406–408, DIG. 14, 381, 420

[56] References Cited

U.S. PATENT DOCUMENTS

| 37,929 | 3/1863 | Warner | 285/408 |
|---|---|---|---|
| 1,660,792 | 2/1928 | Hirth | 403/286 |
| 2,014,313 | 9/1935 | Damsel | 285/408 X |
| 2,303,031 | 11/1942 | Dusevoir | 403/338 |
| 2,303,032 | 11/1942 | Dusevoir | 403/338 X |
| 3,524,665 | 8/1970 | Hohn et al. | 403/273 |

FOREIGN PATENT DOCUMENTS

| 440816 | 2/1927 | Fed. Rep. of Germany . | |
| 2201539 | 8/1972 | Fed. Rep. of Germany . | |
| 1575744 | 10/1972 | Fed. Rep. of Germany . | |
| 2158436 | 5/1973 | Fed. Rep. of Germany | 403/97 |
| 2721306 | 11/1978 | Fed. Rep. of Germany . | |

Primary Examiner—Richard J. Scanlan, Jr.
Attorney, Agent, or Firm—Albert L. Jeffers; Anthony Niewyk

[57] ABSTRACT

A clutch for rigid but releasable connection of two coaxial parts of construction, preferably rotating shafts, having flanges centrally arranged at their proximate shaft ends, in which torque is transmitted by a frontal spur or cog gear. Both flanges are clasped by tension sleeves by means of radially protruding collars. The axial force arises by shrinking the tension sleeves which, in a heated condition, are radially positioned on the flanges. An advantage in connection with Cardan joints is that the external diameter of the clutch is no larger than a cross joint or universal, which can transmit the same torque.

14 Claims, 9 Drawing Figures

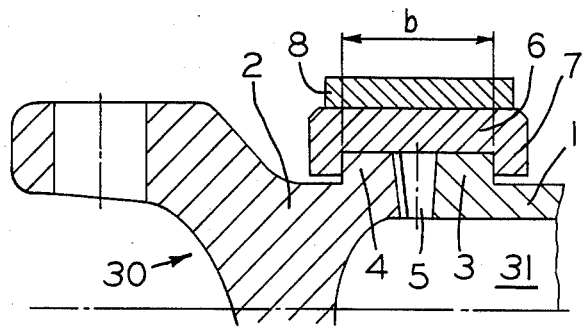
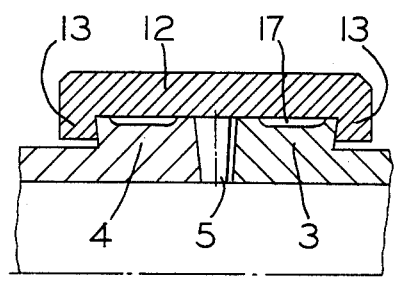
FIG. 1  FIG. 3
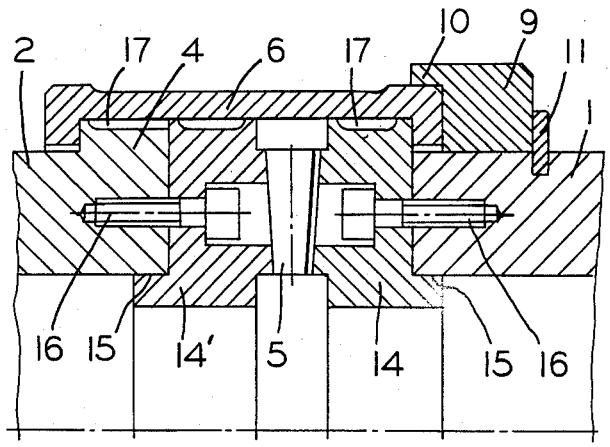
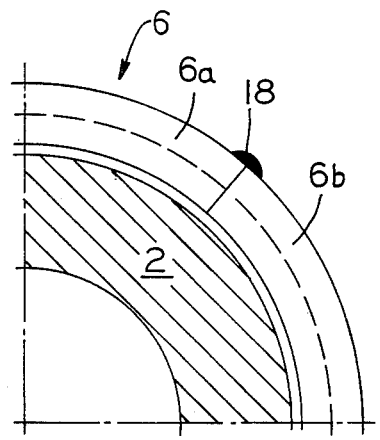
FIG. 2  FIG. 4
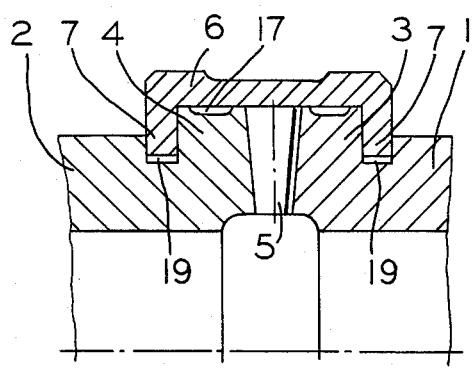
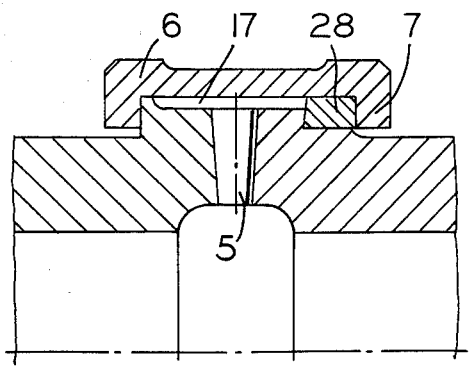
FIG. 5  FIG. 6

CLUTCH FOR RIGIDLY CONNECTING COAXIAL PARTS OF CONSTRUCTION, ESPECIALLY FOR CARDAN SHAFTSBACKGROUND OF THE INVENTION

The invention relates to a rigid, releasable coupling for connecting two coaxial parts of construction, for example, two shafts or rods, which are to transmit turning, drawing, pushing, or bending energies, and particularly for use as a coupling between a shaft and a connecting Cardan shaft and/or parts thereof.

Clutches of this kind are often found in large machinery under the designation of disc clutches. The two ends of the construction parts, primarily rotating shafts to be joined, are built as flanges centrally thereon. The torque transmission occurs either by means of screws that join the flanges, a cross wedge, cotter pin, axial bolts, or by way of a spur or frontal gear. A clutch of this particular type of construction is disclosed in Pat. No. DE-OS 27 21 306. The radial extension of the front-side flange however is disadvantageous in the case of narrow installation conditions, and a very careful mounting of the screws is therefore required.

Another type of clutch is disclosed in Pat. No. DE-OS 22 01 539 wherein two shaft ends are formed conically and pressed together axially by radial clamp pieces. This kind of construction is generally suitable only for small torque elements, and generally is not applicable with heavy machinery.

Yet another type of clutch is disclosed in Pat. No. DE-PS 440 816 in which torque is transmitted by means of a Hirth spur gear. The axial energy arising here is produced by two sleeves mounted on the shaft ends and which are drawn together by a ring nut. This design does provide a diminution of the exterior diameter, however, it causes severe mounting difficulties with shafts having large diameters and correspondingly large threads. Consequently, this construction is generally suited only for smaller clutches.

A further type of clutch is disclosed in Pat. No. DE-PS 1 575 744 wherein the two shaft ends are shaped like flanges and the torque is transmitted by fitting springs. Axial energy is produced by shrinking a sheath, which has been heated and positioned over the flanges of the clutch, which are externally linked, for example, by cogs or gears; the collars of the flanges pointing radially inwardly rest against the back surfaces of the flanges after turning and cooling the sheath. A disadvantage with this particular type clutch is a necessity of having a cog or gear on the flanges and sheath, and the required large axial space necessary for the mounting thereof.

It is an object of the present invention to provide an inexpensively produced clutch for rigid but releasable connection of coaxial construction parts for transmission, without play, of torque, pull, push, and bending energies in both directions of operation, wherein the external diameter of the clutch is as small as possible so as not to exceed, in connection with Cardan shafts, the torque diameter of the cross joint or universal with equal torque capacity.

This object of the invention is provided by the clutch of claim 1. The axial energy, which is to be produced for torque transmission by means of a spur gear, is produced by a tension sleeve device, which comprises at least two part-cylindrical sleeves with radially inwardly projecting collars. The tension sleeves encompass flanges formed on the ends of the clutch halves. The inner axial distance between the oppositely disposed collars of the tension sleeves is, in a heated condition, greater than the axial distance between the back or axially remote surfaces of the oppositely disposed flanges when the flanges are in a joined position of the clutch halves. In this heated condition, the tension sleeves may be easily, radially positioned over the flanges, and, after the tension sleeves have cooled and shrunk, provide a tight coupling of the clutch halves by axial pressure or force.

One advantage of the clutch of the present invention is its simple construction. The provision of flanges on the coupling ends of the clutch, as well as the provision of the collars on the tension sleeves, is for purposes primarily concerned with torque, and further permits precise and cost effective production of the clutch by robots. Further, a cog gear and the requirement of boring pass holes or adaptor drill holes in the flanges is eliminated. By transmitting torque by means of a Hirth gear, the tension sleeves enlarge the external diameter of the clutch only by the thickness thereof as required for construction purposes. This is achieved by having the rotation diameter of the joint, in connection with Cardan shafts, determine the greatest diameter. In addition, a more economic production of the joint forks could be obtained since the expensive counter-forging of the flanges is avoided. Such joint construction parts are easier to adjust to the clutch by turning.

Another advantage of the clutch of the present invention is the reduction of the largest external diameter for drill rods by use of the tension sleeves in connection with a frontal or spur gear. This clutch is particularly advantageous when minimal space is available for mounting. The clutch of the present invention requires only working space near the radial area of the joined coupling halves, and is mountable in any angular position, thereby substantially eliminating any further adjusting or measuring operations.

Although the clutch operates satisfactorily due to the tight shrink-fit of the tension sleeves, it may become necessary to secure the tension sleeves against snapping off of the rotating parts because of centrifugal force. For example, the tension sleeves may be circumferentially secured by a tightly fitting integral ring, or by a multi-part ring secured adjacent the tension sleeves and which tightly secures the sleeves by means of an axially extending collar. Other means for securing the tension sleeves together may be by soldering or welding. Further securement of the tension sleeves to one or both of the coupling halves may be by screws. Also, the collars of the tension sleeves and the flanges of the clutch halves may be formed so as to engage each other in a dovetail manner. A further possibility for securing the tension sleeves may be accomplished by inserting the radially inwardly extending collars thereof into corresponding complementary radial notches disposed in the clutch halves, thereby preventing any substantial deformation due to bending moments.

In one modification of the clutch of the present invention, the mounting of the tension sleeves may be accomplished from the inside of cylindrically-shaped clutch halves, wherein the securing is effected by a cylindrical shell in abutment against the inner surfaces of the tension sleeves. Further, the flanges of the clutch halves need not be integral thereto, but may be separate flanges connected to the clutch halves for bearing the frontal cogs. In a further modification, recesses may be circumferentially disposed in the facing surfaces of the tension sleeves or flanges so as to maximise the engaging force therebetween during the shrinking of the heated tension sleeves.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

FIG. 1 is a broken-away sectional view of a clutch of the present invention between a pipe shaft and a Cardan joint;

FIG. 2 is a broken-away sectional view of a clutch with separately attached flanges;

FIG. 3 is a broken-away sectional view of a clutch having dovetailed collars;

FIG. 4 is a broken-away, transverse sectional view of a tension sleeve;

FIG. 5 is a broken-away sectional view of a clutch having radial notches;

FIG. 6 is a broken-away sectional view of a clutch with a tolerance ring;

DETAILED DESCRIPTION

Figure 7:
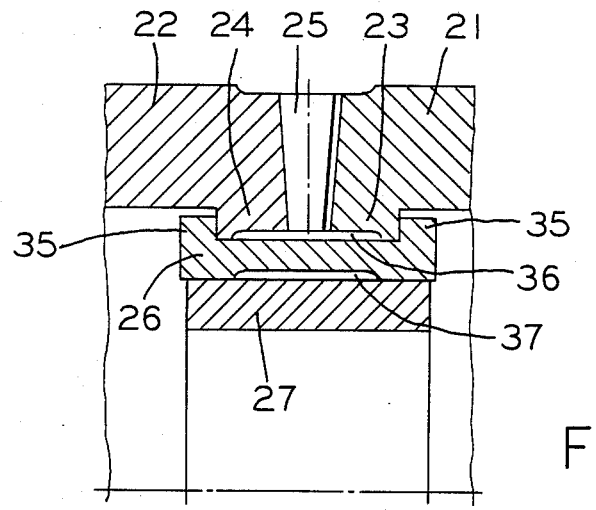
FIG. 7 is a broken-away sectional view of a clutch having interior tension sleeves.

Referring to FIG. 1, two clutch halves 1,2 have their proximate ends integrally formed as flanges 3,4, respectively. The particular joint illustrated in FIG. 1 is a Cardan joint 30 which is attached to tube shaft 31. Flanges 3 and 4 are engaged on their facing surfaces by a frontal or spur gear, preferably a Hirth gear 5. The front surfaces, opposite the facing surfaces of flanges 3 and 4, are generally flat surfaces which extend only a small radial distance beyond the external diameter of clutch halves 1,2. Flanges 3,4 are engaged on their axially remote surfaces by collars 7 of part tension sleeves 6. The axial length between the inner, facing surfaces of oppositely disposed collars 7 is smaller than dimension b when in a cold state, however, in mounting tension sleeves 6, they are heated so as to expand beyond measure b to thereby radially mount against the external surfaces of flanges 3,4. During the cooling process thereafter, tension sleeves 6 shrink to at least measure b, thereby producing through elastic shrinking an axial force which presses clutch halves 1,2 tightly against gear 5. Ring 8 is then circumferentially secured against tension sleeves 6. Ring 8 may be in a cold state and secured against tension sleeves 6 in any suitable manner, or ring 8 may be heated to expand and fit over tension sleeves 6 and then cooled to be secured thereagainst.

Referring to FIG. 2, a multi-part ring 9 having axially extending collar 10 is attached to clutch half 1 by snap ring 11. Collar 10 securely abuts against tension sleeves 6 to prevent loosening thereof during operation.

Still referring to FIG. 2, a modification of clutch halves 1 and 2 is illustrated wherein flanges 3 and 4 are not integral, but are separate cog rings 14 and 14', respectively. Cog rings 14 and 14' engage gear 5, and are attached by screws 16 to clutch halves 1 and 2 against their shoulders 15.

In accordance with the right half of FIG. 2, tension sleeves 6 may directly abut against cog rings 14 and 14', or, as illustrated in the left hand portion of FIG. 2, tension sleeves 6 may abut against flanges 3 and 4 so as to encompass both flanges 3 and 4 and cog rings 14 and 14'.

Referring to FIG. 3, another embodiment of the clutch of the present invention is illustrated wherein the axially remote surfaces of flanges 3 and 4 diverge radially outwardly, and the axial thicknesses of collars 13 of tension sleeves 12 increase radially inwardly. This particular embodiment is desirable when tension sleeves 12 are of relatively long length. Tension sleeves 12 generally must be heated to a higher temperature so that collars 13 may be easily positioned over the edges of flanges 3 and 4, whereupon the cooling of tension sleeves 12 causes them to engage flanges 3 and 4 in a dovetail fashion. This eliminates any further securement against loosening of tension sleeves 12.

FIG. 4 illustrates the separating groove of tension sleeve assembly 6, which is constructed in two parts or segments and in this particular embodiment encompasses the entire circumference of flanges 3 and 4. The two halves 6a and 6b of tension sleeve assembly 12 are joined at 18, for example, by welding.

In another embodiment of the clutch of the present invention illustrated in FIG. 5, radial notches 19 are disposed in flanges 3 and 4 and have widths that correspond to the thicknesses of collars 7. Collars 7 are engagingly received in respective notches 19. This substantially eliminates any widening or tilting of collars 7 during operation of the clutch, and further maintains a tight fit of tension sleeves 6. Also provided in flanges 3 and 4 are radial grooves 17, as well as in the embodiment illustrated in FIG. 3, so that tension sleeves 6 in this embodiment, and tension sleeves 12 in the embodiment of FIG. 3, contact flanges 3 and 4 axially by collars 7 and in the immediate radial areas near collars 7 and gear 5.

The clutch of the present invention may be disengaged by heating the particular tension sleeve device used so that it may be easily removed. This permits clutch halves 1 and 2, which are tightly fitted one to the other, to be reengaged at a different angle, and also permits easy replacement of parts. Any construction tolerances which may exist may be corrected by use of tolerance rings 28 (FIG. 6). Ring 28 may be made in one or more parts, and may be attached by shrinking after the heating thereof according to the particular style of construction of clutch halves 1 and 2. Either one or both clutch halves 1 and 2 may have a tolerance ring 28, which may be attached in a dovetail manner.

Figure 8:
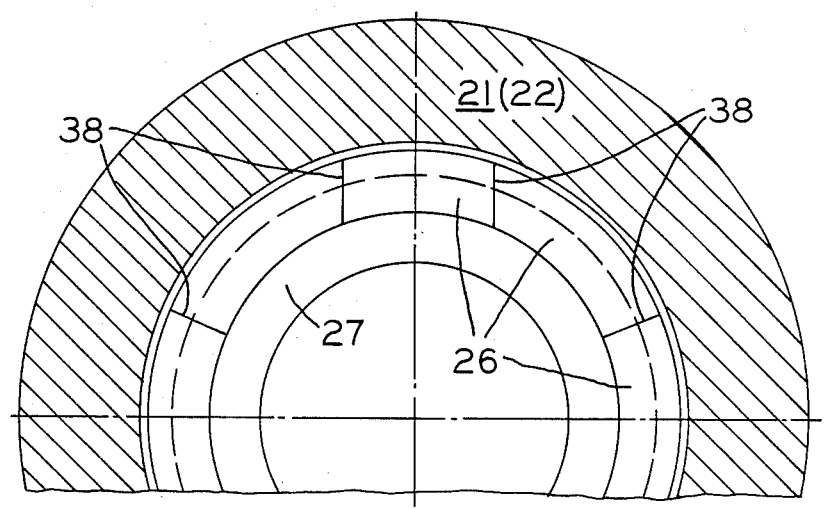
FIG. 8 is a broken-away, transverse sectional view of the clutch of FIG. 7.

Yet another embodiment of the clutch of the present invention is illustrated in FIGS. 7 and 8 wherein clutch halves 21 and 22 are tubular shaped and have flanges 23 and 24, respectively, extending radially inwardly. Hirth gear 25 transmits torque therebetween. Flanges 23 and 24 are encircled by tension sleeves 26, which are heated and engaged to flanges 23 and 24 from the radially inner sides thereof. As may be seen in FIG. 8, through suitable formation of separating notches 38 of tension sleeves 26, tension sleeves 26 engage the major portions of flanges 23 and 24. Cylindrically-shaped shell 27 abuts against tension sleeves 26 for the securement thereof. A tight fit of tension sleeves 26 on flanges 23 and 24 is provided by means of recesses 36 and 37. In this manner, tension sleeves 26 on both flanges 23 and 24 are radially positioned within reach of the separating groove, and gear 25 also is within reach of collars 35. The advantage of this particular arrangement with recesses 36 and 37 is that during mounting of tension sleeves 26, a more uniform shrinking during the cooling of tension sleeves 26 is realized, thereby providing a more equal or uniform axial force distribution at the circumference and a tighter fit. Furthermore, this increases the securement of tension sleeves 26 against loosening during operation, and permits tension sleeves 26 to be more quickly heated up during a dismounting process because of less heat being conducted away by flanges 23 and 24. The clutch described is suitable not only for clutch halves 21,22, which transmit torque by means of gear 25, but may also be used in construction parts that transmit torsion by friction contact, and is furthermore not restricted to only circular construction parts.

Figure 9:
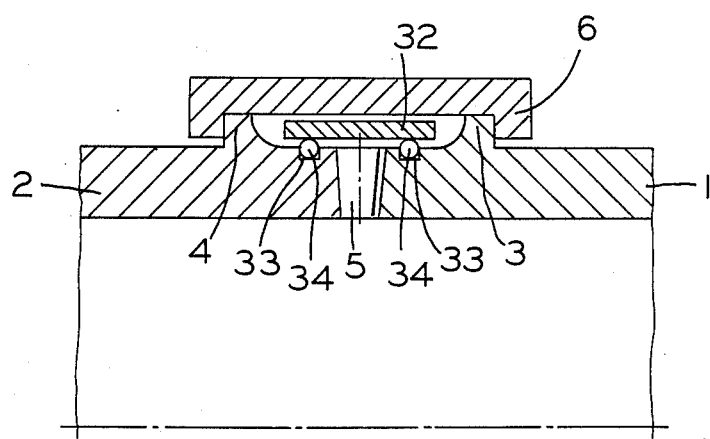
FIG. 9 is a broken-away sectional view of a clutch with a seal therefor.

A still further embodiment of the clutch of the present invention is shown in FIG. 9 wherein radial notches 33 are provided in flanges 3 and 4 for containing seal rings 34. Cap 32 is disposed over seal rings 34 and seals off the clutch against inside pressure or loss of a medium or fluid within the interior of tubular-shaped clutch halves 1 and 2.

The tension sleeves may be further tightly secured to their respective flanges by constructing the tension sleeves so as to have inner diameters slightly smaller than the corresponding outer diameter of the flanges. Upon being heated, the tension sleeves may be easily positioned against the flanges, and, upon cooling, the tension sleeves shrink radially inwardly to tightly fit against the flanges. The shrinking of the tension sleeves therefore occurs in both the axial and radial directions.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A clutch for rigidly connectng coaxially arranged construction members for transmission of torgue, as well as stress and strain, comprising:
clutch means on the proximal ends of two coaxially disposed construction members, each said clutch means having a flange member thereon,
a front cog gear being disposed between the facing surfaces of said flange members for transmitting torque, and
a tension sleeve device comprising at least two part-cylindrical segments each including a pair of axially spaced-apart collar members abutting respective axially remote surfaces of said flange members, said tension sleeve segments radially positioned onto and connected to said flange members, said segments being heat shrunk on said flange members to thereby tightly compress said flange members between said collar members.

2. The clutch of claim 1 further comprising a ring member tightly encompassing said tension sleeve device against radial displacement of said segments.

3. The clutch of claim 2 wherein said ring member axially abuts said tension sleeve device and has an axially extending collar member in radial overlapping engagement with said tension sleeve device.

4. The clutch of claim 1 wherein said tension sleeve segments are welded together to prevent radial displacement thereof.

5. The clutch of claim 1 wherein said axially remote surfaces of said flange members diverge radially outwardly from each other and the facing surfaces of said collars in abutment with said axially remote surfaces diverge radially outwardly, whereby said abutting surfaces fit together in a dovetail manner.

6. The clutch of claim 1 wherein each said clutch means has a circumferentially disposed notch therein, and wherein radial end portions of said collars of said tension sleeve device are engagingly received in respective ones of said notches.

7. The clutch of claim 1 wherein said flange members are individually ring-shaped and connected to respective ones of said clutch means.

8. The clutch of claim 1 wherein the outer peripheral surface of each said flange member, against which said tension sleeve device abuts, has a groove circumferentially disposed therein, whereby said tension sleeve device abuts said flange members axially at said collars and radially in the immediate area adjacent said collars and said front cog gear.

9. The clutch of claim 1 wherein one of said clutch means is articulated for transmitting torque in a Cardan shaft.

10. A clutch for rigidly connecting coaxially arranged construction members for transmission of torque, as well as stress and strain, comprising:
cylindrically-shaped clutch means on the proximal ends of two coaxially disposed construction members, each said clutch means having a radially inwardly extending flange member thereon,
a front cog gear being disposed between facing surfaces of said flange members for transmitting torque, and
a tension sleeve device comprising at least two part-cylindrical segments each including a pair of axially spaced outwardly extending collars abutting respective axially remote surfaces of said flange members, said tension sleeve segments radially positioned onto and connected to said flange members, said segments being heat shrunk on said flange members to thereby tightly compress said flange members between said collar members.

11. The clutch of claim 10 further comprising a cylindrical shell member tightly inserted in said tension sleeve device to secure said tension sleeve segments in place.

12. The clutch of claim 10 wherein said flange members are individually ring-shaped and connected to respective ones of said clutch means.

13. The clutch of claim 10 wherein an inner peripheral surface of each said flange member, against which said tension sleeve device abuts, has a groove circumferentially disposed therein, whereby said tension sleeve device abuts said flange members axially at said collars and radially in the immediate area adjacent said collars.

14. The clutch of claim 10 wherein one of said clutch means is articulated for transmitting torque in a Cardan shaft.

* * * * *